3,560,374
AROMATIC EXTRACTION PROCESS

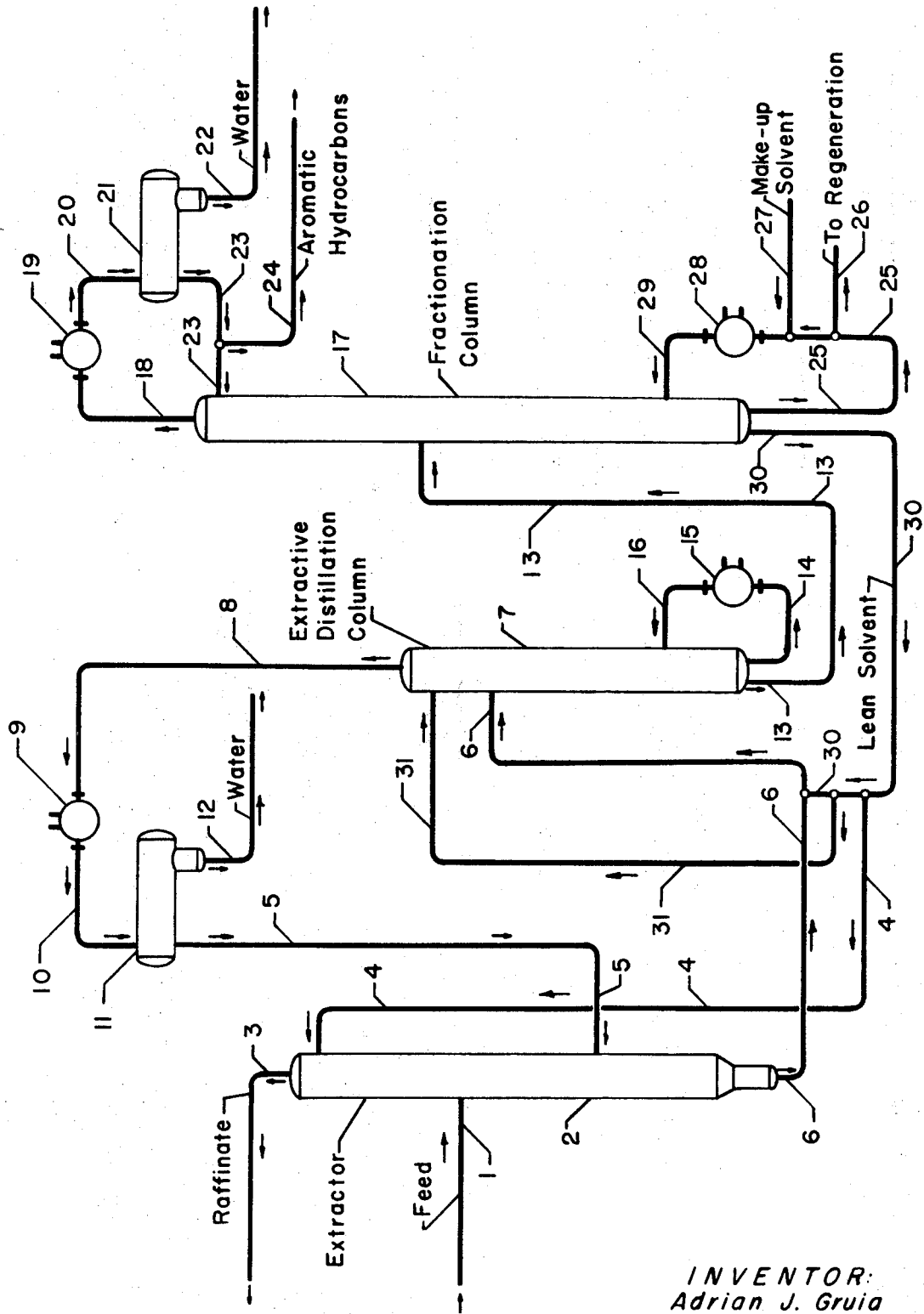

Adrian J. Gruia, Corpus Christi, Tex., assignor to Universal Oil Products Company, Des Plaines, Ill., a corporation of Delaware
Filed Dec. 18, 1968, Ser. No. 784,631
Int. Cl. C10g 21/22
U.S. Cl. 208—313                                                   6 Claims

ABSTRACT OF THE DISCLOSURE

Process for the extraction and recovery of aromatic hydrocarbons utilizing a selective solvent in which extractive distillation of the aromatic hydrocarbon-containing extract phase is utilized. The extractive distillation is performed in a manner such that a secondary absorption or extraction zone is created in the upper portion thereof. The preferred solvent comprises sulfolane and the preferred aromatic hydrocarbon recovered is benzene.

BACKGROUND OF THE INVENTION

The present invention relates to the solvent extraction of aromatic hydrocarbons from a hydrocarbon charge stream. It also relates to a process for the extraction and recovery of high purity aromatic hydrocarbons from a feed stream containing aromatic and non-aromatic hydrocarbons.

It is well known in the art that aromatic hydrocarbons in high purity and high concentration can be recovered from suitable feedstocks via solvent extraction utilizing a solvent which is selective for such aromatic hydrocarbons. Generally, the prior art process involves contacting the feed stream with the selective solvent in an extraction zone containing suitable liquid-liquid contacting devices, such as baffles, trays, rotating discs, and the like. Suitable operating conditions are maintained in the extraction zone sufficient to produce a raffinate phase which comprises a concentrate of the non-aromatic hydrocarbons and solvent. An extract phase is also produced which comprises the solvent having dissolved therein the aromatic hydrocarbons and which, usually, has dissolved therein contaminating quantities of non-aromatic hydrocarbons.

According to prior art practices, the extract phase is then passed into a separation zone which generally comprises one or more fractionating columns which are operated in a manner sufficient to remove non-aromatics from the rich solvent and to recover a high purity aromatic hydrocarbon product stream and a lean solvent composition suitable for reuse in the extraction zone. The non-aromatic hydrocarbon fraction separated from the extract phase is normally returned to the extraction zone to provide a non-aromatic hydrocarbon reflux therein.

The aromatic hydrocarbon extraction process which has been broadly summarized hereinabove is described in greater detail in copending application Ser. No. 540,362, now Pat. No. 3,361,664 by D. B. Broughton et al., wherein the solvent composition comprises sulfolane and water. The typical aromatic extraction process wherein the solvent composition comprises polyalkyleneglycol and water is described in U.S. Pat. No. 2,773,918 by J. H. Stephens. These patents and other published literature set forth the well known processing steps and operating conditions for the aromatic extraction zone which produces a non-aromatic raffinate stream and a rich solvent stream containing aromatic hydrocarbons, and for the subsequent separation zone wherein the rich solvent may be separated to provide a non-aromatic fraction, a high purity aromatic product stream, and a lean solvent stream suitable for reuse in the extraction zone.

More specifically, the prior art schemes have utilized extractive distillation means to separate the contaminating quantities of non-aromatic hydrocarbons from the extract phase leaving the extraction zone. According to prior art techniques, the extract phase is introduced into the upper portion of a stripping column in which extractive distillation occurs by virtue of the temperature and pressure conditions maintained on the feedstock. It was noted that the presence of solvent in the distillation column tends to depress the boiling point of the aromatic components present in the feedstock by dissolving these components into the solvent composition. It is to be noted that the extractive distillation column, according to prior art techniques, is, in reality, an extractive stripper column since the non-aromatic hydrocarbons are removed solely by the mechanism of stripping.

It has been found, however, that the extractive distillation column, or more accurately, the prior art extractive stripping column, does not provide adequate means for removing the non-aromatic hydrocarbon contaminants from the extract phase in an economical and facile manner. In order for prior art techniques to remove substantially all of the non-aromatic hydrocarbons from the extract phase there must be substantial quantities of not only solvent, but also aromatic hydrocarbons (e.g. 30% to 60% by volume) removed from the overhead of the extractive stripping column. The result, of course, is to require increased operating expenses due to the large volume of solvent and aromatic hydrocarbons which must be circulated between the extractive stripper column and the aromatic extraction zone.

SUMMARY OF THE INVENTION

Accordingly, it is an object of this invention to provide an improved process for the extraction and recovery of aromatic hydrocarbans from a hydrocarbon feed stream.

It is another object of this invention to provide an improved process for the recovery of high purity aromatic hydrocarbons from a hydrocarbon feed stream in a facile and economical manner.

It is a specific object of this invention to provide an improved process for the operation of the extraction zone, extractive stripper column, and aromatic recovery column in an interrelated and interdependent manner.

Therefore, in accordance with one embodiment of this invention, there is provided a process for the extraction and recovery of aromatic hydrocarbons from a feed mixture containing aromatic and non-aromatic hydrocarbons with a sulfolane-type solvent which comprises the steps of: (a) introducing said feed mixture into a first solvent extraction zone maintained under aromatic hydrocarbon extraction conditions including the presence of said sulfonane solvent sufficient to produce an extract phase comprising said solvent having aromatic hydrocarbons dissolved therein and contaminated with non-aromatic hydrocarbons and a first raffinate phase comprising non-aromatic hydrocarbons; (b) passing said extract phase into a second solvent extraction zone in the presence of hereinafter specified sulfolane solvent under conditions sufficient to produce a second raffinate phase comprising non-aromatic hydrocarbons and an aromatic concentrate stream comprising aromatic hydrocarbons and sulfolane-type solvent; (c) subjecting said concentrate stream to extractive distillation thereby producing from said distillation zone a bottoms fraction comprising said sulfolane solvent and aromatic hydrocarbons; (d) recovering aromatic hydrocarbons from said bottoms fraction thereby producing a lean sulfolane-type solvent stream; and (e) introducing at least a portion of said lean solvent of Step (d) to said second extraction zone as the specified solvent.

Another embodiment of this invention includes the process hereinabove wherein at least a portion of said second raffinate phase is returned to said first extraction zone as reflux thereon.

In essence, therefore, it can be seen that the present invention provides an improved solvent extraction process which embodies the concepts of a secondary extraction zone operating in conjunction with the extractive distillation operation. It is to be noted that there are produced by the broad embodiment of this invention two separate non-aromatic hydrocarbon streams which are utilized in a unique and special manner.

DETAILED DESCRIPTION OF THE INVENTION

As a broad general class, suitable feedstocks for the satisfactory practice of this invention include fluid mixtures having a sufficiently high concentration of aromatic hydrocarbons to economically justify recovery of these aromatic hydrocarbons as a separate product stream. The present invention is particularly applicable to hydrocarbon feed mixtures which contain at least 25% by weight aromatic hydrocarbons. A suitable carbon number range for the feedstock is from about 6 carbon atoms per molecule to about 20 carbon atoms per molecule and, preferably, from about 6 to 10 carbon atoms per molecule. One source of feedstock is the debutanized reactor effluent from a conventional catalytic reforming process unit. Another source of satisfactory feedstock is the liquid by-product from a pyrolysis gasoline unit which has been selectively hydrotreated to saturate olefins and diolefins, thereby producing an aromatic hydrocarbon concentrate suitable for the solvent extraction technique described herein. Typically, the feedstock from a catalytic reforming process unit contains single ring aromatic hydrocarbons comprising a wide boiling mixture of benzene, toluene, and xylenes. These single ring aromatic hydrocarbons are mixed with the corresponding paraffins and naphthenes which have been produced from such a catalytic reforming unit.

The preferred solvent which may be utilized in the present invention is a solvent of the sulfolane-type. This solvent is well known to those skilled in the art and, typically, possesses a five membered ring containing one (1) atom of sulfur and four (4) atoms carbon with two (2) oxygen atoms bonded to the sulfur atom of the ring. Since this solvent is an article of commerce and is well known to those versed in the solvent extraction art, greater detail thereof need not be presented at this time.

Other solvents which may be included and may satisfactorily be used in the practice of this invention are the sulfolenes, such as 2-sulfolene and 3-sulfolene. Still other typical solvents which have a high selectivity for separating aromatic hydrocarbons from non-aromatic hydrocarbons and which may be processed within the scope of the present invention are 2-methyl-sulfolane, 2–4, dimethylsulfolane, methyl-2-sulfonylether, n-aryl-3-sulonyl-amine, 2-sulfonylacetate, diethyleneglycol, various polyethylene-glycols, dimethylsulfoxide, N-methylpyrrolidone, various mixtures of the above, and the like. The specifically preferred solvent for use in the practice of the invention is sulfolane.

The aromatic selectivity of the solvent can usually be further enhanced by the addition of water to the solvent. Preferably, the solvents utilized in the practice of this invention contain small quantities of water in order to increase the selectivity of the overall solvent phase for aromatic hydrocarbon over non-aromatic hydrocarbons without reducing substantially the solubility of the solvent phase for aromatic hydrocarbon. The presence of water in the solvent composition further provides a relatively volatile material therein which is distilled from the solvent in the extractor stripper, more fully discussed hereinafter, to vaporize the last traces of non-aromatic hydrocarbons from the solvent stream by steam distillation. The composition of the present invention preferably contains from about 0.5% to about 20% by weight water and preferably from about 0.5% to 5% by weight depending upon the particular solvent utilized and the process conditions at which the extraction zones and extractive stripper are operated.

The extraction zone of the present invention is operated at elevated temperature and sufficiently elevated pressure to maintain the feedstock, the solvent and reflux streams in liquid phase. Typically, suitable temperatures, when using solfolane as the solvent, are within a range from about 8° F. to about 400° F. and, preferably, from about 175° F. to about 300° F. Similarly, suitable pressures are generally within the range from about atmospheric pressure up to about 400 p.s.i.g. and, preferably, from 50 to 150 p.s.ig., sufficient to maintain the components of the system in liquid phase.

The extract phase produced in the extraction zone contains not only the desired aromatic hydrocarbons dissolved in solvent, but also contains contaminating quantities of non-aromatic hydrocarbons. As previously mentioned, these non-aromatic hydrocarbons must be removed before aromatic hydrocarbons of high purity can be recovered. According to the practice of the present invention, the extract phase is introduced into an intermediate location of an extractive stripper column. Concurrently therewith, lean solvent is introduced into the upper portion of an extractive stripper column and suitable conditions are maintained therein to provide a secondary adsorption or extraction zone in that portion of the extractive stripper between the said inlet locus and the upper locus for the introduction of the lean solvent. The lower portion of the extractive stripper column operates in substantial conformity with the prior art schemes in that extractive stripping of the aromatic concentrate stream takes place so that the bottoms from the extractive stripper contains essentially aromatic hydrocarbons and solvent and the total overhead from the extractive stripper contains a concentrate of non-aromatic hydrocarbons, e.g. substantially free of aromatic hydrocarbons.

At this point it should be noted that upon comparison with the prior art schemes, the overhead vapor from the inventive extractive stripper operation has substantially reduced aromatic hydrocarbon content and a significantly reduced solvent content. Therefore, the non-aromatic hydrocarbon reflux technique requires the movement of significantly less quantities of material than the prior art schemes.

As those skilled in the art are well aware, the prior art processing schemes produced an overhead from the extractive stripper which contained from 30% to 60% by volume aromatic hydrocarbons whereas practice of the present invention permits, for example, the production of a non-aromatic hydrocarbon concentrate stream have significantly less than 30% by volume aromatic hydrocarbons, e.g. 10% to 15%.

Typically, according to the present invention, the extractive distillation column is maintained under pressures from atmospheric to about 100 p.s.i.g. and in some cases may be subatmospheric; although, in practice, the top of the extractive distillation column, including absorber section, is maintained at from 10 p.s.i.g. to 20 p.s.i.g. The reboiler temperature maintained in the extractive distillation column, of course, is dependent upon the composition of the feedstock and of the solvent selected for use in the extraction zone. The column is arranged to take only an overhead fraction and only a bottoms fraction as separate product streams. It is to be noted, therefore, that the upper portion of the extractive distillation column can be characterized as being a secondary extraction zone for the absorption of aromatic hydrocarbons out of the hydrocarbon phase thereby producing a second raffinate phase having a significantly reduced aromatic hydrocarbon content.

The aromatic and solvent recovery column is operated at low pressures and sufficiently high temperatures to distill the aromatic hydrocarbons overhead as a distillate fraction, thereby producing a bottoms fraction comprising lean solvent which is generally suitable for reuse in the solvent extraction zone. Again, the choice of operating conditions depends upon the feedstock characteristics and the composition of the solvent. Preferably, the top of the aromatic recovery column is operated at about 100 to 400 mm. Hg absolute. These sub-atmospheric pressures must be employed in order to maintain a sufficiently low reboiler temperature to avoid thermal decomposition of the solvent, particularly when the solvent is of the sulfolane-type. Preferably, the reboiler temperature should be maintained below about 360° F. when using aqueous sulfolane as the solvent.

Returning now to the operation of the extractive distillation column: the overhead stream from the extractive distillation column is in the vapor state and comprises primarily non-aromatic hydrocarbons of the naphthene and/or paraffin type together with solvent, water, and minor quantities of aromatic hydrocarbons. This overhead vapor stream is condensed to separate the water from the hydrocarbon phase and the hydrocarbon phase in a preferred embodiment of this invention is returned at least in part to the extraction zone as reflux therein. Alternatively, the hydrocarbon phase may be removed from the process as a separate product stream for utilization in, for example, gasoline blending.

The invention may be further understood with reference to the appended drawing which is a schematic representation of apparatus for practicing one embodiment of the invention.

DESCRIPTION OF THE DRAWING

Referring now to the drawing, hydrocarbon feedstock containing aromatic hydrocarbons, such as the desired product from a conventional catalytic reforming unit, comprising benzene, toluene, and xylene mixed with corresponding naphthenes and paraffins, enters the system via line 1 and is passed into extractor 2. Aqueous sulfolane as the lean solvent enters extractor 2 at an upper portion thereof via line 4 and an essentially non-aromatic hydrocarbon reflux from a source hereinafter described enters extractor 2 at the lower end thereof via line 5.

A raffinate stream is withdrawn from extractor 2 via line 3 as a separate product stream for use in, for example, gasoline blending, or as a solvent for the extraction of lean oil, i.e. an edible oil solvent. An extract phase comprising sulfolane solvent having aromatic hydrocarbons dissolved therein and which is contaminated with minor amounts of non-aromatic hydrocarbons, such as the corresponding naphthenes and paraffins, is withdrawn from extractor 2 via line 6.

According to the practice of this invention, the extract phase in line 6 is admixed with additional lean solvent as needed from line 30 and passed into extractive distillation column 7 at an intermediate location between the ends of column 7. Additional sulfolane solvent is introduced into extractive distillation column via line 31 at the upper portion thereof. Sufficient conditions are maintained in column 7 to privide an absorption or secondary extraction to take place in that portion of column 7 between the introduction points for line 6 and line 31. It is a critical aspect of this invention that there be at least from 2 to 20 theoretical stages or trays separating lines 6 and 31. Typically, this will correspond to about 5 to 10 actual contact plates between lines 6 and 31, with 40 plates overall in the column.

The conditions maintained in extractive distillation column 7 are sufficient to produce a bottoms fraction comprising solvent having dissolved therein the desired aromatic hydrocarbons, such as benzene, toluene, and xylene, said bottoms being removed from column 7 via line 13. A portion of the bottoms material from column 7 is passed via line 14 through reboiler 15 and reintroduced into the column via line 16 to supply the heat necessary for the operation of the column.

Extractive distillation column 7 is equipped with conventional contacting devices, such as trays or discs, but preferably contains valve type trays properly designed to provide intimate contact between liquid and vapor in column 7. Since the upper portion of extractive distillation column 7 operates as a secondary extraction zone, the overhead vapor material in line 8 comprises non-aromatic hydrocarbons, steam, solvent, and, if any, a minor amount of aromatic hydrocarbons. This vapor stream is passed via line 8 into condenser 9 which condenses the total stream and the condensate is passed via line 10 into accumulator 11 which is equipped with suitable separation means to permit the separation of water and hydrocarbons. The separated water is withdrawn from the system via line 12. In a preferred embodiment of this invention, the concentrate of non-aromatic hydrocarbons is withdrawn from accumulator 11 and passed via line 5 into extractor 2 in the manner previously descirbed. Alternatively, however, the material in line 5 may be withdrawn from the system as a separate non-aromatic hydrocarbon stream and processed together with the raffinate stream in line 3 or processed separately.

The bottoms stream from extractive distillation column 7 now contains only solvent and aromatic hydrocarbons, although, it is understood that it may contain non-aromatic hydrocarbons to the extent that such contaminants can be tolerated within the specifications set for the aromatic hydrocarbons to be subsequently recovered. This material in line 13 is passed into aromatic and solvent recovery column 17 which is maintained under conditions sufficient to separate the aromatic hydrocarbons from the solvent. The aromatic hydrocarbons are concentrated as a distillate fraction and removed from recovery column 17 via line 18, condensed in condenser 19, and passed via line 20 into accumulator 21. Since, typically, steam is used for stripping purposes in fractionating column 17, a water phase is separated and withdrawn from accumulator 21 via line 22. An aromatic hydrocarbon stream is withdrawn via line 23 and passed as required into column 17 as reflux thereon. A net product stream representing the desired aromatic hydrocarbons is withdrawn from the system via line 24.

The operation of recovery column 17, as previously mentioned, includes the use of steam stripping in the column in order to remove the final traces of aromatic hydrocarbons from the solvent. Therefore, the lower end of column 17 contains the desired solvent plus water in sufficient amounts such that the material withdrawn from column 17 via line 30 comprises lean solvent suitable for reuse in the process.

It is known that solfolane solvent undergoes thermal decomposition when utilized in the manner set forth in the practice of this invention. Therefore, a portion of the solvent material from column 17 is withdrawn via lines 25 and 26 and passed into solvent regeneration means, not shown. The regenerated solvent, as needed, is introduced as makeup via lines 27. Furthermore, a circulating stream of the bottom material from column 17 is passed through reboiler 28 and line 29 to supply the necessary heat for proper operation of fractionation column 17.

In accordance with the practice of this invention, the lean solvent in line 30 is passed in part via line 31 into the upper portion of extractive distillation column 7 for use in the manner discussed hereinabove. As needed, another portion of the material in line 30 is introduced into admixture with the extract phase in line 6. Finally, the remaining portion of the lean solvent in line 30 is passed via line 4 into the upper end of extractor 2 as the lean solvent for use in extractor 2 as discussed.

PREFERRED EMBODIMENT

Therefore, according to the description presented thus far, the preferred embodiment of the present invention includes a process for the extraction and recovery of monocyclic aromatic hydrocarbons from a feed mixture containing aromatic and non-aromatic hydrocarbons which comprises the steps of: (a) introducing said feed mixture into a solvent extraction zone maintained under aromatic hydrocarbon extraction conditions including the presence of a sulfolane-type solvent sufficient to produce an extract phase comprising said solvent having aromatic hydrocarbons dissolved therein and contaminated with non-aromatic hydrocarbons, and a raffinate phase comprising non-aromatic hydrocarbons; (b) passing said extract phase into an extractive distillation column at a locus intermediate the ends of said column; (c) passing hereinafter specified lean solvent into said extractive distillation column at a locus in the upper portion of said column, said lean solvent locus being above said extract phase locus; (d) withdrawing from said extractive distillation column a first overhead fraction comprising a concentrate of non-aromatic hydrocarbons, and a first bottoms fraction comprising solvent having aromatic hydrocarbons dissolved therein; (e) passing said first bottoms fraction into fractionation means maintained under distillation conditions sufficient to produce a second overhead fraction comprising aromatic hydrocarbons, and a second bottoms fraction comprising lean solvent suitable for reuse in said extraction zone; (f) introducing a portion of said second bottoms fraction into said upper portion of the extractive distillation column as said specified lean solvent stream; and, (g) recovering said second overhead fraction.

The invention claimed:

1. Process for the extraction and recovery of aromatic hydrocarbons from a feed mixture containing aromatic and non-aromatic hydrocarbons with a sulfolane-type solvent which comprises the steps of:
   (a) introducing said feed mixture into a solvent extraction zone maintained under aromatic hydrocarbon extraction conditions including contact with said sulfolane solvent sufficient to produce an extract phase comprising said solvent having aromatic hydrocarbons dissolved therein and contaminated with non-aromatic hydrocarbons, and a raffinate phase comprising non-aromatic hydrocarbons;
   (b) introducing said extract phase into a extractive distillation column at a point intermediate the top and bottom thereof;
   (c) introducing hereinafter specified lean solvent to the upper portion of said column above said intermediate point and subjecting the extract phase to secondary aromatic absorptive contact with said lean solvent in said upper portion of the column;
   (d) subjecting the remaining extract phase to extractive stripping in the portion of said column below said intermediate point;
   (e) withdrawing from said extractive distillation column a first overhead fraction comprising a concentrate of non-aromatic hydrocarbons, and a first bottoms fraction comprising solvent having aromatic hydrocarbons dissolved therein;
   (f) fractionating said first bottoms fraction under distillation conditions sufficient to produce a second overhead fraction comprising aromatic hydrocarbons, and a second bottoms fraction comprising lean solvent;
   (g) introducing a portion of said second bottoms fraction into said upper portion of the extractive distillation column as said specified lean solvent;
   (h) introducing another portion of said second bottoms fraction to said solvent extraction zone as sulfolane-type solvent therein; and
   (i) recovering said second overhead fraction comprising aromatic hydrocarbons.

2. Process according to claim 1 wherein said solvent comprises a sulfolane-type chemical of the general formula:

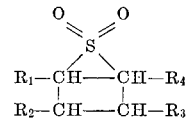

wherein $R_1$, $R_2$, $R_3$, and $R_4$ are independently selected from the group comprising a hydrogen atom, an alkyl group having from one to ten carbon atoms, an arylalkyl radical having from one to twelve carbon atoms, and an alkoxy radical having from one to eight carbon atoms.

3. Process according to claim 2 wherein said solvent comprises sulfolane.

4. Process according to claim 1 wherein said solvent comprises a sulfolene selected from the group consisting of 2-sulfolene and 3-sulfolene.

5. Process according to claim 1 wherein at least a portion of said first overhead fraction is passed into said solvent extraction zone as reflux therein.

6. Process according to claim 1 wherein from 2 to 20 theoretical plates separate said lean solvent inlet from said extract phase inlet to the column.

References Cited

UNITED STATES PATENTS

| | | | |
|---|---|---|---|
| 2,956,088 | 10/1960 | Krewer et al. | 208—321 |
| 3,132,093 | 5/1964 | Arnold et al. | 208—321 |
| 3,321,542 | 5/1967 | Cottle | 208—321 |
| 3,361,664 | 1/1968 | Broughton et al. | 208—321 |
| 3,435,087 | 3/1969 | Broughton | 208—321 |

HERBERT LEVINE, Primary Examiner

U.S. Cl. X.R.

208—317, 321, 325